United States Patent
Buekenhoudt et al.

(10) Patent No.: US 8,980,096 B2
(45) Date of Patent: Mar. 17, 2015

(54) SURFACE MODIFIED INORGANIC MATRIX AND METHOD FOR PREPARATION THEREOF

(75) Inventors: Anita Buekenhoudt, Geel (BE); Kenny Wyns, Geel (BE); Vera Meynen, Geel (BE); Bert Maes, Wilrijk (BE); Pegie Cool, Keerbergen (BE)

(73) Assignees: Vito NV, Mol (BE); Universiteit Antwerpen, Antwerpen (BE)

( * ) Notice: Subject to any disclaimer, the term of this patent is extended or adjusted under 35 U.S.C. 154(b) by 779 days.

(21) Appl. No.: 13/257,581

(22) PCT Filed: Mar. 19, 2010

(86) PCT No.: PCT/EP2010/053616
§ 371 (c)(1),
(2), (4) Date: Sep. 19, 2011

(87) PCT Pub. No.: WO2010/106167
PCT Pub. Date: Sep. 23, 2010

(65) Prior Publication Data
US 2012/0012528 A1    Jan. 19, 2012

(30) Foreign Application Priority Data
Mar. 20, 2009 (EP) .................................. 09155686

(51) Int. Cl.
*B01D 61/00* (2006.01)
*B01D 39/00* (2006.01)
*B01D 39/14* (2006.01)
*B01D 67/00* (2006.01)
*B01D 69/12* (2006.01)

(52) U.S. Cl.
CPC ............ *B01D 67/0093* (2013.01); *B01D 69/12* (2013.01); *B01D 2323/04* (2013.01); *B01D 2323/38* (2013.01)

USPC ................ 210/650; 210/500.25; 210/500.27; 210/502.1; 264/48

(58) Field of Classification Search
CPC ...... B01D 9/723; B01D 71/02; B01D 71/022; B01D 71/26; C02F 7/28
USPC .......... 210/500.35, 500.26, 490, 500.27, 650, 210/651, 500.25, 502.1; 264/48
See application file for complete search history.

(56) References Cited

U.S. PATENT DOCUMENTS 4,861,480 A * 8/1989 Berardo et al. ............... 210/490
4,992,178 A * 2/1991 Chaufer et al. .............. 210/651

(Continued)

FOREIGN PATENT DOCUMENTS

| DE | 102 23 103 | 12/2003 |
| JP | 2003-517363 | 7/2003 |
| WO | 99-61140 | 12/1999 |

OTHER PUBLICATIONS

International Search Report for PCT/EP2010/053616 mailed Jul. 8, 2010.

*Primary Examiner* — Ana Fortuna
(74) *Attorney, Agent, or Firm* — Hunton & Williams LLP

(57) ABSTRACT

The present invention relates to a method for the modification of metal hydroxide and/or metal oxide surfaces of an inorganic matrix with an organometallic reagent for obtaining an organic functionalized matrix suitable for filtration processes. The method involves the direct covalent binding of organic functional groups by allowing a pre-treated matrix to react with organometallic reagents in the present of a suitable solvent. The present invention further relates to an organic functionalized matrix obtainable or obtained by carrying out a method according to the invention. The invention also provides various uses of a surface-modified matrices as described herein in various industrial applications, including for instance in filtration and/or adsorption and/or separation processes, or as support, e.g. for catalyst systems or for enzyme systems.

21 Claims, 8 Drawing Sheets

(56) References Cited

U.S. PATENT DOCUMENTS

| | | | |
|---|---|---|---|
| 5,961,838 A * | 10/1999 | Braden et al. | 210/728 |
| 6,596,173 B1 | 7/2003 | Chaufer et al. | |
| 6,797,206 B1 * | 9/2004 | De Vos et al. | 264/45.1 |
| 2006/0237361 A1 | 10/2006 | Dudziak et al. | |
| 2013/0281324 A1 * | 10/2013 | Gouliaev et al. | 506/26 |

* cited by examiner

SURFACE MODIFIED INORGANIC MATRIX AND METHOD FOR PREPARATION THEREOF

CROSS-REFERENCE TO RELATED APPLICATIONS

This is the U.S. National Stage application of International Patent Application No. PCT/EP2010/053616, filed Mar. 19, 2010, which claims priority to EP 09155686.0, filed Mar. 20, 2009, the disclosures of each of which are hereby incorporated by reference in their entirety.

TECHNICAL FIELD

The present invention relates to the field of surface modification of metal hydroxide and/or oxide surfaces of inorganic matrices. In particular, the invention provides a method for the modification of metal hydroxide and/or metal oxide surfaces of an inorganic matrix with an organometallic reagent for obtaining an organic functionalized matrix suitable for filtration processes. The present method involves the direct covalent binding of one or more different organic functional moieties to a surface of said matrix by application of organometallic chemistry. The invention further relates to surface-modified inorganic matrices and to various industrial uses of surface-modified matrices according to the invention.

BACKGROUND

Ceramic membranes are made from inorganic materials such as, alumina, titania and zirconia oxides including mixtures thereof and have benefits, especially compared to polymeric membranes, in view of their characteristics. They are chemically inert and feature high mechanical, thermal and hydrothermal stabilities. Ceramic membranes are known to be robust in extreme processing conditions such as e.g. temperature, corrosion or cleaning conditions and exhibit long lifetimes. Therefore ceramic membranes are suitable for being used in processes where thermal, mechanical and hydrothermal stability are required as well as in those applications where chemical resistance is necessary.

Ceramic membranes have their own surface chemistry essentially consisting of $M^1$-OH and $M^1$-O-$M^1$ structure in which $M^1$ is a transition metal or a metal. In view of such surface chemistry, a hydrophilic behaviour of ceramic membranes limits their applications. By means of chemical surface modification, also denoted as functionalisation, the character of the membrane can be changed, for instance from hydrophilic to hydrophobic. Surface modification reactions involve the replacement of OH groups provided on the surface of the membrane by other groups, e.g. organic functional groups, in order to give the membranes a specific character such as e.g. hydrophobicity, but also other functionalities such as for instance selective adsorption sites, anchoring positions for immobilization, chiral sites etc.

Various methods have been reported for the surface-modification of ceramic membranes including methods involving for instance co-condensation reactions, grafting reactions with organosilane or phosphonic acids, polymerization reactions on the surface etc.

For instance, WO 99/61140 discloses that by co-condensation of a hydrocarbyl metal alkoxide with a sol-gel precursor such as e.g. a metal alkoxide, a hydrophobic sol can be obtained. This sol is then coated on a membrane support. Co-condensation refers to a process where the functionalisation of the membrane occurs during the synthesis step. Additional organosilane precursors are used in the synthesis together with the normal silica or metal oxide (e.g. metal alkoxide) precursor. During the synthesis step, both precursors undergo the sol-gel process and condensate together to form a homogeneous hybrid sol that can be coated on the membrane support. Co-condensation incorporates the functional groups during synthesis such that the modifications are not concentrated at the surface such as in a post-modification method. This technique of co-condensation has some important disadvantages. The number/concentration of organic functional groups that can be applied on the membrane is limited, and introduction of high concentrations of organic functional groups would seriously decrease the structural properties and stability of the formed membranes. In addition, the number of possible precursor molecules that can be added during the condensation reaction is limited and such molecules are often very expensive. Therefore, the versatility of such co-condensation method is limited. The stability of these materials towards hydrolysis reactions may, in some cases, be higher. However, due to the lower number of functional groups on the surface of the membrane, these membranes show less functionality, there is no control with regard to the position of the functional groups in the membrane and the membranes have a lower $Q_4/Q_3$ ratio, leading to a lower general stability of the membrane.

An alternative approach for the preparation of functionalized membranes consists of applying surface grafting reactions. Organosilane grafting is one of the applied techniques. US application number 2006/237361 for instance discloses a method for the impregnation of a ceramic membrane with an organosilane agent. The organosilane agent is of general formula R1R2R3R4Si in which at least one R group is a hydrolyzable group and at least one R group is a non-hydrolyzable group like alkyl group, phenyl group, which can be at least partially fluorinated. Bonding of the organosilane agent to the membrane surface occurs by a condensation reaction of the hydrolyzable groups with OH groups on the surface of the oxide membrane. This results in covalent bonding of the organosilane agent on the membrane through an oxygen bridge which is very susceptible to hydrolysis. Moreover when organosilane grafting is applied on metal oxide membranes comprising $TiO_2$, $ZrO_2$ low stabilities are obtained, which may ultimately result in unwanted leaching of organic functional group(s) from the membrane after some time on stream.

U.S. Pat. No. 6,596,173 discloses the grafting of filtration membranes with organomineral compounds. These organomineral compounds react via their hydrolysable group(s), i.e. their alkoxy or carboxyl function(s), with the mineral functions of the separating membrane layer. Whereas the resulting M-O—R bond is a covalent bond, the oxygen makes the grafted material unstable and easily hydrolysable. As a result thereof the organomineral groups are removed easily from the membrane over time thereby rendering the filtration membrane less efficient. The same leaching of organic functional group(s) from the membrane occurs in membranes as disclosed in DE 102 23 103. This German patent application discloses a similar grafting technique with sol-gel precursors, the resulting membrane having similar drawbacks as the membranes according to U.S. Pat. No. 6,596,173.

Grafting with phosphonic acids is another approach for the formation of hydrophobic or functional ceramic materials. This method involves a coordination or iono-covalent interaction of a phosphonic acid with a metaloxide surface (J. Caro, M. Noack, P. Kölsch, Micropor. Mesopor. Mater. 22 (1998) 321). However, leaching problems of the organic functional groups are likely to happen, depending on the type of solvent used and at high flux rates, since the complexes are sensitive to a nucleophilic attack. In addition, phosphor is known to have negative influence on the environment. Moreover, the amount of available organic functional groups on phosphonic acids is limited.

In view of the above, although methods are available in the prior art for the surface modification of ceramic membranes, these methods are limited in various ways, e.g. towards modification with different types, amounts of organic functional groups applied, practicability of the methods, etc.

Furthermore, the surface-modified ceramic membranes that can be obtained with above-disclosed methods sometimes show an inadequate thermal and/or hydrothermal stability. More in particular, an important problem of prior art modified ceramic membranes is that they sometimes show considerable release (leakage) of bond organic functional groups, especially under harsh operational conditions.

In view of the above drawbacks, it is an object of the present invention to provide a method for preparing an organic functionalized matrix, and in particular an organic functionalized ceramic membrane, which overcomes at least some of the above mentioned problems. More in particular, the invention aims to provide a method wherein a surface of an inorganic matrix or of a ceramic membrane has been modified by covalently binding an organic functional group on said surface directly on the metal $M^1$. In particular, the present invention aims to provide a method which is highly versatile, allowing a broad variety of modifications of surfaces of matrices or membranes.

The invention also aims to provide an organic functionalized matrix, i.e. a matrix of which a surface has been modified with organic functional groups, and in particular aims to provide a organic functionalized ceramic membrane that has adequate thermal and/or hydrothermal stability and that shows poor or substantially reduced leaching of attached groups. Another object of the invention is to provide an organic functionalized matrix, and in particular an organic functionalized ceramic membrane, which can be modified in a controlled manner and which has a high modification degree.

SUMMARY

The present invention provides a solution to at least some of the above-mentioned problems by providing a method for the modification of metal hydroxide and/or metal oxide surfaces of an inorganic matrix with an organometallic reagent for obtaining an organic functionalized matrix. The present invention provides a method for preparing surface-modified matrices, i.e. matrices or membranes of which a surface has been modified or functionalized with an organic functional group. The present invention provides a method for surface modification of a matrix involving the direct covalent binding of organic functional group(s) onto a surface of such matrix.

In a first aspect, the invention thereto provides methods for the modification of metal hydroxide and/or oxide surfaces of an inorganic matrix with an organometallic reagent for obtaining an organic functionalized matrix, more particularly a functionalized matrix suitable for filtration processes. In particular embodiments, the invention provides methods for obtaining an organic functionalized matrix characterized by the direct covalent bond of one or more different organic functional moieties to its surface comprising the steps of:
  a) drying the inorganic matrix under vacuum,
  b) removing protons of the dried inorganic matrix by reacting said dried matrix with a reagent, whereby said reagent is preferably an alcohol,
  c) removing the excess of said reagent, preferably alcohol,
  d) reacting the dried matrix obtained in step c) in the presence of a dry solvent with an organometallic reagent, and
  e) optionally washing and further drying the obtained organic functionalized matrix.

In particular embodiments, the invention provides methods wherein the organometallic reagent is of the formula $R^1\text{-}M^2$ or of formula $R^1\text{-}M^2\text{-}X$ or of the formula $R^1\text{-}M^2\text{-}R^{1'}$, wherein $R^1$ and $R^{1'}$ are organic functional groups as defined herein and wherein $R^1$ and $R^{1'}$ are different or identical, $M^2$ is Li or Mg, and X is a halogen. Preferably said organometallic reagent is selected from the group comprising organolithium reagents of general formula $R^1$—Li and organomagnesium reagents (Grignard reagents) of general formula $R^1$—Mg—X or of general formula $R^1\text{-}M^2\text{-}R^1$, wherein $R^1$ and $R^{1'}$ are organic functional groups as defined herein ($R^1$ and $R^{1'}$ can be different or identical), and wherein X is selected from the group consisting of Cl, Br, I, and any mixtures thereof.

In another preferred embodiment, the invention provides a method wherein said metal ($M^1$) is a Group IVb transition metal or mixtures thereof. More preferably, a method is provided wherein said transition metal is titanium or zirconium, and any mixtures thereof.

In particular embodiments, the invention provides methods wherein the alcohol of step b) is of formula $R^2$—OH wherein $R^2$ is an alkyl, and particularly a linear $C_1$-$C_8$ alkyl, more preferably a $C_1$-$C_4$ and most particularly a $C_1$ alkyl. In particular embodiments $R^2$ is a linear $C_4$ alkyl.

In particular embodiments, the invention provides methods wherein step b) is performed for at least several hours, preferably more than 3 hours and most preferably 48 hours at the reflux temperature of said alcohol.

In particular embodiments, methods are provided wherein the matrix obtained in step b) is dried under vacuum prior to step d).

In particular embodiments, the invention provides methods wherein step d) is carried out at room temperature preferably for between 1 and 6 days.

In particular embodiments, the invention provides methods wherein step d) is carried out at a temperature which is lower than the boiling point of said dry solvent.

In particular embodiments, methods are provided wherein said steps b) to d) are carried out under inert atmosphere, preferably under argon atmosphere.

In accordance with particular embodiments the methods according to the invention are repeated one or more times.

The present invention thus relates to methods for the modification of a surface of an inorganic matrix involving the direct covalent binding of a $R^1$ or $R^{1'}$ moiety or group, herein also referred to as an organic group or as an organic functional group, to a surface of said matrix, by the application of organometallic chemistry, i.e. by using organometallic reagents such as e.g. Grignard reagents and organolithium reagents.

A beneficial feature of the present methods compared to other modification methods is the versatility of these methods towards possible organic functional groups. The present methods allow a broad variety of different types of matrix/membrane modifications: the present methods permit to prepare organic-inorganic (hybrid) materials with a broad range of possible organic functional groups on a surface thereof, e.g. hydrophobic groups, selective adsorption sites, anchoring groups etc., by means of organometallic reactions on an inorganic matrix that has been pretreated, and in particular that has been deprotonated. Organic functional groups that can be directly covalently bound to a matrix according to the present invention are very diverse and a large amount of organometallic reagents are available and/or can be synthesized following general synthesis approaches for organometallic reagents, known in the art.

The present methods therefore also advantageously allow a specific modification/functionalisation of inorganic matrixes in function of their desired uses. For instance, specifically functionalized matrices are highly desired for certain applications, e.g. for use in specific filtration processes in which surface functionalisation is relevant in order to increase fluxes, improve separation/selectivity, prevent or stimulate adsorption of certain molecules, create anchoring sites for catalysts/enzymes and other molecules or organisms. In an example, if highly hydrophobic matrices are to be obtained, the present method for instance involves the binding of group(s) with relatively long carbon chains possibly in combination with methyl functional groups to prevent steric hindrance. In another example, the bonding of moieties comprising fluorocarbons is also a suitable way to obtain hydrophobic matrices.

The present methods can also be applied for the preparation of multiple modified inorganic matrices that have various different moieties of a same class or of different classes directly covalently bound to their surface. This can be achieved by a repeated functionalisation and/or by the addition of different organometallic reagents in the reaction mixture during step d) of the present method. Therefore, even more versatile matrices towards $R^1$ groups and more strongly functionalized matrices can be obtained.

In particular embodiments, the present methods allow pore size engineering: i.e. defining pore size of modified inorganic matrices. Moreover, both pore size engineering and functionalisation/modification can be done simultaneously. By changing the length of the carbon chains in the $R^1$ or $R^{1'}$ moieties and/or by multiple and/or repeated modifications with $R^1$ or $R^{1'}$ moieties and/or by the nature of the $R^1$ or $R^{1'}$ moieties, the pore diameter of the membranes can be decreased.

In another aspect, the invention provides organic functionalized matrixes obtainable or obtained by carrying out methods according to the invention.

The invention provides organic functionalized matrices, wherein said matrix is an inorganic filtration membrane comprising a support made of inorganic material coated with at least one separating membrane layer comprising particles of transition metal hydroxides and/or transition metal oxides at the surface having an average pore size of 1 to 10 nm.

In particular embodiments, the invention provides inorganic filtration membranes obtainable with a method according to the invention comprising a support made of inorganic material coated with at least one separating membrane layer comprising particles of transition metal hydroxides and/or oxides at the surface on which are directly covalently grafted an organic functional group obtainable with the method according to the invention. In a preferred embodiment, an inorganic filtration membrane is provided, wherein the organic functional group ($R^1$ or $R^{1'}$) directly covalently bound to the surface is chosen from the group comprising alkyl, (per)fluoroalkyl, aryl, (per)fluoroaryl and any combinations thereof.

An organic functionalized matrix is provided having one or more $R^1$ or $R^{1'}$ moieties, as defined herein, that are directly bound covalently to a metal group on a surface of said matrix thereby providing more stable organic-inorganic interfaces. This type of direct covalent binding of $R^1$ or $R^{1'}$ moieties to a surface of a matrix greatly improves stability of the obtained matrix when applied in a broad range of preparation, application and cleaning conditions. The improved stability of surface-modified matrices disclosed herein originates from a strong direct covalent bonding, represented with formula $M^1$-C, with $M^1$ referring to the metal as defined herein, and preferably a transition metal of group IVb, comprised within said matrix, and C referring to a carbon atom in a group $R^1$ or $R^{1'}$ as defined herein, in which said $R^1$ or $R^{1'}$ group is directly, covalently bond via a carbon atom to the metal centre on the matrices' surface. Therefore, rehydrolysis and bond breaking of the bound $R^1$ or $R^{1'}$ moieties is greatly prevented and no leaching of the $R^1$ or $R^{1'}$ organic functional group occurs. Compared to other modified ceramic membranes, surface-modified ceramic membranes according to the present invention are more versatile towards the type and amount of different functional groups $R^1$ or $R^{1'}$ and will be able to resist more critical conditions even at sub-monolayer coverage, such as e.g. more solvent streams, including water and alcohols, e.g. for longer times, and for instance also at elevated temperatures, allowing applications of the present matrices in a wide variety of conditions and feed compositions.

As compared to other techniques commonly known in the art, the methods according to the present invention provide in the direct covalent binding of the organic functional groups to the surface of the matrix. The resulting $M^1$-C bond does not include an oxygen bridge, which is contrary to the commonly known methods. This greatly improves the stability of the obtained matrix. Compared to grafting with for instance organominerals such as organosilane, which typically forms a M-O—Si—R covalent bond, the stability of the M-R covalent bond with the method according to the present invention provides a bond which is not hydrolysable and provides therefore in a highly stable and highly efficient membrane.

Surface-modified matrices obtained or obtainable by carrying out a method according to the invention have a high functionalization degree and can be functionalized in a targeted adjustable manner. Also, surface-modified membranes obtained or obtainable by carrying out a method as disclosed herein show an improved stability, i.e. show lower amounts of organic functional groups that will leach from the membranes when used under certain temperature or solvent conditions. The herein disclosed surface-modified membranes are therefore suitable for use in various technical, biotechnological, pharmaceutical, food and medical fields.

In view thereof, in yet another aspect, the invention is directed to the use of an organic functionalized matrix according to the invention or of an inorganic filtration membrane according to invention. In particular embodiments, the invention relates to the use of an organic functionalized matrix according to the invention or of an inorganic filtration membrane according to invention in filtration and/or adsorption and/or separation processes.

In particular embodiments, the invention relates to the use of an organic functionalized matrix according to the invention or of an inorganic filtration membrane according to invention as support, e.g. for catalyst systems, for enzyme systems, for molecules or organisms, etc.

Other benefits, advantages and uses of the invention will become apparent upon reading and understanding the below given specification.

FIGURES

Figure 7:
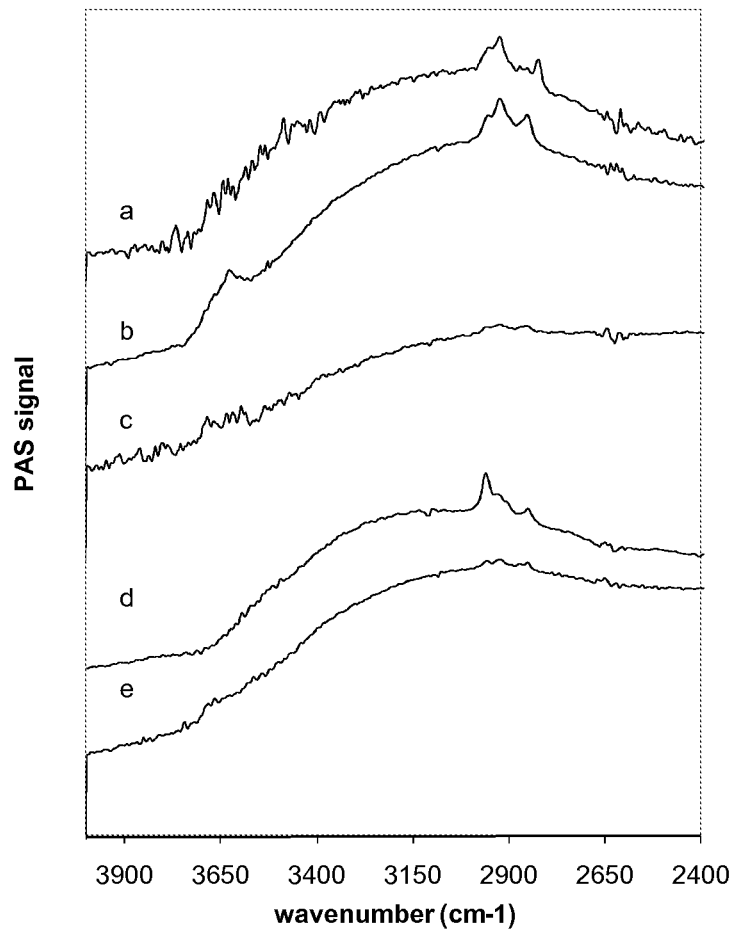
Figure 8:
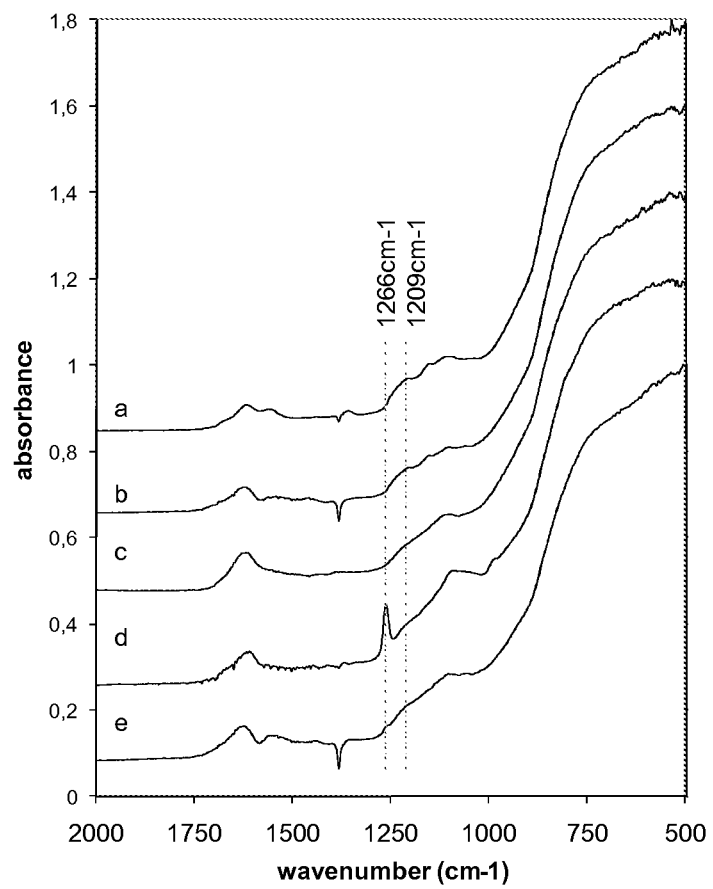

FIG. 7 shows Photo Acoustic Spectra (PAS) measurements of (a) C1 modified $TiO_2$ powder without pre-treatment, (b) C1 modified $TiO_2$ without pre-treatment after $H_2O$ reflux, (c) untreated $TiO_2$ powder, (d) $TiO_2$ powder modified by silanation with DCDMS and (e) $TiO_2$ powder modified by silanation with DCDMS after $H_2O$ reflux FIG. 8 shows DRIFT spectra measured for (a) C1 modified $TiO_2$ powder without pre-treatment, (b) C1 modified $TiO_2$ without pre-treatment after $H_2O$ reflux, (c) untreated $TiO_2$ powder, (d) $TiO_2$ powder modified by silanation with DCDMS and (e) $TiO_2$ powder modified by silanation with DCDMS after $H_2O$ reflux.

DETAILED DESCRIPTION OF THE INVENTION

The present invention is directed to a modification and in particular to a functionalisation of a surface of an inorganic matrix.

The term "matrix" as used herein refers generally to a substrate, which can take different forms such as, but not limited to a membrane.

The inorganic matrix according to the present invention is characterized by a structure which can be represented by $M^1$-OH and $M^1$-O-$M^1$ structure in which $M^1$ is a transition metal or a metal.

In particular embodiments of the present invention, the terms "matrix" refers to a "membrane". In further particular embodiments an "inorganic matrix" is an "inorganic membrane", also denoted herein as a "ceramic membrane".

In a particular embodiment, an inorganic matrix as used herein is a porous matrix. The term "porous matrix" as used in the present specification refers to a substrate possessing or full of pores, wherein the term "pore" refers to a minute opening or microchannel by which matter may be either absorbed or passed through. Particularly, where the pores allow passing-through of matter, the matrix is likely to be permeable.

The inorganic matrix according to the invention may be in the form of a tube, sheet, disc or other shape of natural or synthetic material that is permeable to substances in solution or to gases. In an embodiment, said inorganic matrix has the shape of a tube, disc, film, monolith, fiber, hollow fiber, capillaries, etc. The matrix may be planar or have simple or complex shape.

The expression "surface" as used within the context of the present invention is understood to comprise the (macroscopic) outer surface as well as the inner pore surfaces of a matrix. The surface to which the organic functional group is adhered may thus be an external surface and/or an internal surface of the matrix. Particularly where the surface is porous, the molecule is likely to be attached to an internal surface. Where the solid surface is porous, various pore sizes may be employed depending upon the nature of the system.

The terms "modification" and "functionalisation" are used interchangeably herein and both refer to the direct covalent bonding of organic group(s), also defined herein as R, or in particular embodiments $R^1$ and/or $R^{1'}$ moieties, onto a surface of a matrix as defined herein. The terms "modification" and "functionalisation" thus refer to the surface modification of matrices as defined herein, involving the direct attachment of organic functional groups onto a surface of such matrix in order to achieve desired surface properties. The present method permits to attach virtually any kind of organic compound onto a surface of the herein defined marix as long as there is compatibility with organometalic reaction. In this context the terms "modified" or "surface-modified" or "functionalized" matrix should also be considered as synonyms and refer to a matrix as defined herein, having organic compound(s) directly attached to their surface including the surface of the pores within the membrane via an $M^1$-C bonding.

The terms "$R^1$ group", "$R^{1'}$ group", "$R^1$ moiety", "$R^{1'}$ moiety", "organic group" and "organic functional group" are used herein to refer to an organic molecule that when bound to the surface of a matrix is able to alter the properties of said surface. The $R^1$ and $R^{1'}$ groups are further defined below.

The present invention provides an organic functionalized matrix. The term "organic functionalized matrix" intends to refer to a matrix of which the surface properties have been changed or modified (functionalized) by directly, covalently binding an organic group thereto.

Methods

The present invention relates in a first aspect to methods for the modification of metal hydroxide and/or metal oxide surfaces of an inorganic matrix with an organometallic reagent for obtaining an organic functionalized matrix suitable for filtration processes. The methods according to the present invention refers to a post-modification method wherein the functionalisation of the membrane occurs after the synthesis of the membrane.

In particular, the invention provides a method for the modification of a surface of a inorganic matrix by directly covalently binding at least one organic functional group as defined herein thereto. The present method is, at least partly, based on the application of reactions with organometallic compounds such as Grignard reagents and organolithium reagents enabling the formation of a direct covalent bonding of $R^1$ and/or $R^{1'}$ moieties as defined herein to the metal centre provided on a surface of an inorganic matrix.

Reactions with organometallic reagents have been reported in the art to be applied on powdery inorganic materials. For instance Tamura et al. (1999, J. Colloid and Interface Science, 209, 225-231) discloses reaction of a metal oxide powder sample with a Grignard reagent to study the surface hydroxyl site density of oxide samples. However, this document does not refer to the possibility of bonding of organic groups. The advantages of using this reaction to provide a direct covalent bonding of organic groups on a matrix is an important contribution of the present invention.

In particular embodiments, the methods of the present invention relate to the modification of metal hydroxide and/or metal oxide surfaces of a membrane. There is no suggestion in the prior art that it would be desirable to carry out organometallic reactions on inorganic membranes. Even to the contrary, organometallic reactions are seen as highly impractical for surface modification of ceramic membranes, due to their high reactivity in general and their violent reaction with water. Further, due to their strong base properties they react violently with protons. In view of these characteristics, using organometallic reactions on metal oxide, and specifically transition metal oxide, membranes does not seem plausible and is even discouraged in view of the presence of hydroxyl groups on the surface of metal oxide membranes. Moreover, the wetability of ceramic transition metal oxide membranes as defined herein is very fast, even in term of seconds. In this way, the surface of such ceramic membrane would be rapidly covered with adsorbed water, and this would cause organometallic reactions to occur with surface-adsorbed water instead of with metal centers provided on the membrane surface.

Nevertheless, the Applicants have now surprisingly and successfully established a method involving the covalent bonding of organic functional groups to a surface of an inorganic matrix as defined herein using organometallic chemistry, even if the characteristics of inorganic matrices as defined herein, and organometallic reaction conditions teach away from such application.

within particular embodiments of the invention, the present method substantially prevents wetting of a surface of an inorganic matrix and gives rise to a removal of the hydroxyl groups on the surface(s) of such matrices in combination with practical measures to assure dry conditions during modification/functionalisation.

Moreover, the functionalisation method allows functionalizing the surface of various shapes of inorganic matrices including tubular membranes, hollow fibres, and others. Therefore, various types of industrially available inorganic matrices can be modified and produced on industrially relevant scales. Generally, matrices which can be modified according to the present invention comprise particles of (transition) metal hydroxides and/or (transition) metal oxides at the surface having an average pore size of 1 to 10 nm or larger.

Examples of inorganic matrices that can be modified according to a method of the present invention include for instance, but are not limited to:
- a zirconium oxide matrix having a pore size of 3 nm or a titanium oxide matrix having a pore size of 5 nm (purchasable from Inocermic)
- a titanium oxide matrix with cut-off of 5 or 10 kDalton (pore size on average 3 to 6 nm) (purchasable from Atech)
- a mixed oxide matrix (titaniumoxide+zirconiumoxide) with cut-off of 5 or 10 kDalton (pore size on average 3 to 6 nm) (purchasable from Atech)
- a titaniumoxide matrix with cut-off of 1, 3, 5 or 8 kDalton (pore size on average 1 to 5 nm) (purchasable from Tami Industries).

In particular, the method for the modification of metal hydroxide and/or oxide surfaces of an inorganic matrix comprises the steps of:
a) drying the inorganic matrix under vacuum,
b) removing of protons of the dried inorganic matrix by reacting it with a reagent, the reagent is preferably an alcohol,
c) removing the excess of alcohol,
d) reacting the dried matrix obtained in step c) in the presence of a dry solvent with an organometallic reagent, and
e) optionally washing and further drying the obtained organic functionalized matrix.

The method will now be described with reference to its different steps.

In an optional embodiment, the method comprises the step of sealing the matrix before subjecting it to a drying step, as defined above. "Sealing" as used herein involves the application of a seal on at least some parts of the matrix. For instance, the extremities of a tubular membrane may be sealed. Sealing is preferably done with a solvent resistant material. Such materials are well-known in the art and comprise for instance Teflon or glass. Sealing methods are well-known in the art and will therefore not be disclosed in detail herein.

The sealing step, if applied, should be carried out prior to the modification method, since applying a seal to a matrix requires a treatment at elevated temperature, generally above 350° C., and at such temperatures some organic groups may start to decompose. Moreover, advantageously, the heat treatment for sealing may induce the removal of some of the OH-groups on a surface of a membrane by dehydrolysis reactions resulting in less protons on the membranes' surface that are able to interfere with organometallic modification.

Step a) of the methods according to the invention comprises drying of the inorganic matrix. It is preferred that the said matrix is dried under vacuum and at elevated temperatures to remove as much surface-adsorbed water as possible. In an example, this drying step is carried out at a temperature of at least 60° C. for at least 2 hours at a vacuum of at least 200 mbar. The drying step may for instance be performed at a temperature of between 60 and 300° C. and for instance of between 75 and 200° C., for 2 to 24 hours, and for instance for 4 to 20 hours. The drying step may be performed at a vacuum of preferably between $10^{-5}$ mbar and 0.2 bar, depending on the experimental set-up with most preferably at least $10^{-3}$ mbar After the drying step, the dried matrix is kept as dry as possible during the remaining modification method.

In a next step b), the protons of the dried inorganic matrix obtained in step a) are removed by reacting it with a reagent. This step results in removal of the protons of the surface. In a preferred embodiment the dried matrix is allowed to react with an alcohol of formula $R^2$—OH wherein $R^2$ is an alkyl, and preferably a linear $C_1$-$C_8$ alkyl, more preferably linear $C_1$-$C_4$ alkyl and most preferably a $C_1$ alkyl. In particular embodiments $R^2$ is a linear $C_4$ alkyl.

Examples of alcohols which are suitable for use as solvent in step b) of the present method include but are not limited to methanol, ethanol, propanol, isopropanol, butanol (1-butanol), isobutanol (2-methyl-1-propanol), sec-butanol (2-butanol), tert-butanol (2-methyl-2-propanol), 1-pentanol (amyl alcohol), 1-hexanol. Preferred alcohols are alcohols of formula $R^2$—OH, wherein $R^2$ is a $C_1$-$C_4$ alkyl as defined above, such as for instance methanol, propanol or butanol, In one embodiment, step b) is performed for at least 1 hour, more suitably for at least 3 hours, more suitably for more than 12 hours, and preferably for at least 24 hours and most preferably for at least 48 hours at about the reflux temperature of said alcohol.

Preferably step b) is carried out under an inert, i.e. water-free atmosphere, for example under argon, nitrogen, dry air. Preferably step b) is carried out under argon atmosphere.

Advantageously, alcohol pretreatment of an inorganic matrix according to the invention permits to replace interfering protons, i.e. protons of acid functions such as "H" in "—OH". The surface of the matrix thereby obtains a $M^1$-O-$R^2$ configuration, wherein $M^1$ represents a metal or transition metal of the matrix as defined herein, O represents oxygen and $R^2$ represents the alkyl chain of the applied alcohol as defined above.

Also, alcohol pretreatment of an inorganic matrix according to the invention allows to introduce hydrophobic carbon chains on a surface of the matrix, that will decrease the wetability (re-wetting) of the membrane and slow down the adsorption of water on such surface of the membrane.

After reaction, the alcohol solvent applied in step b) is separated from the pre-treated matrix and preferably recuperated. In an advantageous embodiment, the alcohol solvent applied in step b) can be reused in another pretreatment if dried e.g. by passing it over a molecular sieve. For instance, a molecular sieve can be added to the recuperation bottle of the recuperated alcohol.

In particular embodiments, step b) is carried out under conditions allowing a sufficient contact of said alcohol with a surface of said matrix. For example, said conditions may be obtained by agitating, e.g. by stirring and/or shaking and/or circulation and/or filtration of said alcohol through said matrix, and/or by agitating, e.g. by stirring and/or shaking, said membrane through said alcohol.

In particular embodiments, the matrix is kept under substantially dry reaction conditions during step b). The term "substantially dry reaction conditions" as used herein, refers to a minimized presence of water during the method step, and preferably refers to conditions during said method step wherein the water is completely absent. Substantially dry reaction conditions considerably prevent and/or slow-down re-wetting of the inorganic matrix during this method step. To obtain substantially dry reaction conditions during step b) different measures can be taken. For instance, in one embodiment, the present method encompasses introducing, in particular bubbling an inert gas such as for instance nitrogen or argon through the alcohol applied in step b). In another embodiment, the present method comprises the step of bringing, preferably periodically, the inorganic matrix into contact with an inert gas, e.g. nitrogen or argon during step b).

In a next step c), the excess of reagent is removed. More particularly this is achieved by drying the inorganic matrix obtained in step b). In particular embodiments of step c), the inorganic matrix obtained in step b) is dried under vacuum to remove all excessive alcohol and to obtain a dry membrane. Drying of the matrix in this step allows minimizing hydrolysis of the —O—$R^2$ moieties obtained during step b) into —OH moieties. It is highly preferred that all alcohol is removed in order to prevent side reactions. Preferably the "dry matrix" obtained in this step of the present method contains substantially no surface-adsorbed water.

In particular embodiments, step c) is carried out at a temperature which is lower than the boiling point of said alcohol. In an example, step c) of the present method is carried out at a temperature equal to the boiling point of the solvent minus about 10 to 20 degrees. In general, step c) of the present method is carried out at a temperature of at least 60° C. for at least 2 hours, at a vacuum of at least 200 mbar. The drying step may for instance be performed at a temperature of between 60 and 175° C. and for instance of between 75 and 125° C., for 2 to 24 hours, and for instance for 4 to 20 hours, at a vacuum of preferably between $10^{-5}$ mbar and 0.2 bar, depending on the experimental set-up with most preferably at least $10^{-3}$ mbar The reaction conditions applied in step c) are carefully chosen to prevent the removal of the $R^2$ moieties, introduced on the surface of the matrix during step b), which are only weakly bonded and at the same time ensure the removal of alcohols that contain OH groups and cause side reactions that are pernicious for the functionalization.

In particular embodiments of the methods of the invention, the inorganic matrix obtained in step c) is allowed to cool down, preferably until a temperature of below the boiling point of the solvent that will be applied under step d) and preferably to room temperature, under inert atmosphere, e.g. nitrogen, argon or dry air before being further treated.

In a next step d) the inorganic matrix obtained in step c) is allowed to react with at least one organometallic reagent in the presence of a dry solvent. In particular embodiments, this is performed under inert atmosphere.

The terms "dry solvent" and "dried solvent" are used as synonyms and refer to a solvent that has substantially no water content. In an embodiment, a dry solvent as applied during step d) refers to a solvent that has been dried, e.g. by passing said solvent over a molecular sieve such as e.g. zeolite before use according to techniques that are well known in the art. Solvents which may be used in step d) of the present method comprise any type of solvents that do not react with the applied organometallic reagents and preferably do not react with the inorganic membrane. In a preferred embodiment said step d) is carried out in the presence of a solvent selected from the group comprising but not limited to ethers such as THF (tetrahydrofuran), methyl-THF, diethylether, tert-butyl methyl ether, cyclopentylmethylether, 1,2-dimethoxyethane, 1,4-dioxane etc. This is preferably done under excess reagent conditions, more preferably at more than 5% to 20% excess organometallic reagents per single hydroxyl group —OH of the inorganic matrix after step a). Suitable dry solvents may also be commercially purchased under the trade name "seccosolve" or any other trade name as known to the skilled person.

The present step involves reacting the membrane obtained in step c) in the presence of a solvent with at least one organometallic reagent. An organometallic reagent as used herein may be represented by formula $R^1$-$M^2$ or formula $R^1$-$M^2$-X or formula $R^1$-$M^2$-$R^{1'}$, wherein $R^1$ and $R^{1'}$ are moieties as defined herein below, $M^2$ is a metal selected from the group Ia or IIa, more particularly selected from Li and/or Mg, and wherein X is a halogen. $R^1$ and $R^{1'}$ can be different or identical. An organolithium reagent is an organometallic compound with a direct bond between a carbon and a lithium atom and may be represented by the general formula $R^1$—Li wherein $R^1$ is a moiety as defined herein below. An organomagnesium reagent (Grignard reagent) is an organometallic compound with a direct bond between a carbon and a magnesium atom and may be represented by the general formula $R^1$—Mg—X or $R^1$—Mg—$R^{1'}$, wherein $R^1$ and $R^{1'}$ are moieties as defined herein and wherein $R^1$ and $R^{1'}$ can be different or identical, and wherein X is a halogen atom, and preferably Br, Cl or I. An organometallic reagent as used within the present invention is more preferably a Grignard reagent.

By using two or more different organometallic reagents, the present method advantageously allows to directly bind on a surface of an inorganic membrane two or more different types of moieties, e.g. hydrocarbons of different lengths, amine functional groups with capping methyl groups (i.e. all non-reacted positions being occupied by methyl groups to lower steric hindering and improving reaction), etc.

In particular embodiments, the reaction step d) is preferably carried out at room temperature for at least between 1 and 6 days, and preferably for at least 3 days and more preferably 4 days. The reaction can be carried out at room temperature or at elevated temperatures. Depending on the stability of the reagent, temperatures between room temperature and 65° C. are preferred with more preferably temperatures between 35° C. and 50° C.

In particular embodiments, the inorganic matrix is kept under dry reaction conditions during step d). The term "dry reaction conditions" as used herein, indicates that any presence of water during the method step is avoided. To obtain such conditions different measures can be taken. In one embodiment, the present step d) is carried out under an inert atmosphere, preferably an argon, nitrogen or dry air atmosphere while also bubbling argon, nitrogen or dry air through the reaction vessel. In another embodiment, the present method comprises the step of bringing, preferably periodically, the inorganic matrix into contact with an inert gas, e.g. nitrogen or argon. The solvent is added under dry atmosphere as exemplified in the examples.

In particular embodiments, step d) is carried out under conditions allowing a sufficient contact of the reaction solution comprising one or more organometallic reagents in the presence of a dry solvent with a surface of said matrix. For example, said conditions may be obtained by agitating, e.g. by stirring and/or shaking and/or circulation and/or filtration of the reaction solution through the matrix, and/or by agitating, e.g. by stirring and/or shaking, said matrix through said reaction solution.

The next step e), is an optional step in the methods of the present invention. In particular embodiments the membrane obtained in step d) is washed by an appropriate solvent, appropriate to dissolve the reaction products of step d). The washing process can be repeated if necessary. Preferably washing is done by means of filtration through the membrane pores, in particular to prevent that reaction products would remain on the matrix and in the pores of the matrix. Preferably filtration is done under pressure.

In case the organometallic reaction in step d) was done with a reagent of general formula $R^1$-$M^2$-X or $R^1$-$M^2$, the washing is preferably done with an acid, water and an organic solvent, successively. Preferably said acid is selected from the group comprising any acid comprising one or more protons such as e.g., HCl, HBr, $HNO_3$, $H_2SO_4$, $H_3PO_4$ as well as organic acids such as acetic acid etc. Preferably the acid is a hydrogen halide such as HCl. Examples of suitable organic solvents are alcohols such as ethanol, methanol, other solvents such as acetone or mixtures thereof. It is preferred to use an alcohol that evaporates fast while being still dissolvable in water. In case of perfluorocarbon functional groups, acetone is a preferred organic washing solvent.

In case the organometallic reaction in step d) was done with a reagent of general formula $R^1$-$M^2$-$R^{1'}$, the washing is preferably done with a dry ether, such as THF, methyl-THF, diethylether, tert-butyl methyl ether, cyclopentylmethylether, 1,2-dimethoxyethane, 1,4-dioxane etc.

The method may further optionally comprise the step of drying the obtained matrix, preferably under vacuum. In an example, drying is carried out at a temperature of at least 60° C. for at least 2 hours, at a vacuum of at least 200 mbar. The drying step may for instance be performed at a temperature of between 60 and 300° C., preferably between 60 and 200° C. and for instance of between 75 and 200° C., and preferably between 75 and 140° C., for 2 to 24 hours, and for instance for 4 to 20 hours, at a vacuum of between $10^{-5}$ mbar and 0.2 bar, depending on the experimental set-up with most preferably at least $10^{-3}$ mbar.

In particular embodiments, the present method steps are repeated at least once, in particular including steps b) to e). In particular after washing step e), the process may be repeated starting with another pre-treatment step such as pre-treatment with alcohol. Repeated modifications can for instance be applied to increase the hydrophobic nature and the amount of organic functional group(s) on the surface of the membrane. This permits to bind two or more different types of organic groups directly on a surface of a membrane according to the invention. Alternatively or in combination therewith, different types of organic groups can also be directly covalently bound by addition of two or more different organometallic reagents during step d) of the present method.

The moiety $R^1$ or $R^{1'}$ applied in the present invention is an organic group. The moieties $R^1$ or $R^{1'}$ can be the same or can be different and include A) any functional group which is compatible with organometallic compounds, and B) any functional group which is not compatible with organometallic compounds, but in such case said functional group is provided in a protected form (i.e. with a protective group). Protective groups are well known in the art and will not be disclosed in detail herein.

Examples of $R^1$ or $R^{1'}$ moieties include but are not limited to alkyl, haloalkyl, aryl, haloaryl, amines (primary, secondary and tertiary amines), thiols, chiral hydrocarbons, etc . . . and any combinations thereof.

The moiety $R^1$ or $R^{1'}$ applied in the present invention is preferably selected from the group comprising:
 i) alkyl, preferably $C_1$-$C_{16}$alkyl, more preferably $C_1$-$C_8$alkyl;
 ii) haloalkyl, preferably fluoroalkyl or perfluoroalkyl, more preferably fluoro$C_1$-$C_{16}$alkyl or perfluoro$C_1$-$C_{16}$alkyl, more preferably fluoro$C_1$-$C_8$alkyl or (per)fluoro$C_1$-$C_8$alkyl;
 iii) aryl, preferably $C_6$-$C_{18}$aryl, more preferably $C_6$-$C_{12}$aryl;
 iv) haloaryl, preferably fluoroaryl or perfluoroaryl, more preferably fluoro$C_6$-$C_{18}$aryl or perfluoro$C_6$-$C_{18}$aryl, more preferably fluoro$C_6$-$C_{12}$aryl or perfluoro$C_6$-$C_{12}$aryl;

and any combinations thereof. Combinations may comprise combinations within groups i), ii) iii) and iv) given above as well as combination between these groups.

In particular embodiments, said $R^1$ and/or $R^{1'}$ is selected from the group comprising amines, di-amines, tri-amines, thiol, chiral hydrocarbons and any combinations thereof. Combinations in this context may comprise combinations within groups as well as combination between these groups.

$R^1$ or $R^{1'}$ moieties as used herein may comprise lineair, branched or cyclic molecules. For instance, the term "alkyl" is intended to encompass linear, branched as well as cyclic alkyl. The term "aryl" is intended to encompass monocyclic, polycyclic or heterocyclic aryl. The term "haloalkyl" is intended to encompass alkyl as defined herein substituted with one or more halogen atoms. The term "(per)fluoroalkyl" is intended to encompass alkyl as defined herein substituted with one or more fluor atoms. The term "haloaryl" is intended to encompass aryl as defined herein substituted with one or more halogen atoms, preferably substituted with between 1 and 5 halogen atoms. The term "(per)fluoroaryl" is intended to encompass aryl as defined herein substituted with one or more fluor atoms, preferably substituted with between 1 and 5 fluor atoms.

Whenever the term "substituted" is used in the context of the present invention, it is meant to indicate that one or more hydrogens or carbons on the atom indicated in the expression using "substituted" is replaced with a selection from the indicated group, provided that the indicated atom's normal valency is not exceeded, and that the substitution results in a chemically stable compound, i.e. a compound that is sufficiently robust to survive isolation to a useful degree of purity from a reaction mixture.

Organic Functionalized Matrix

The present invention provides an organic functionalized matrix obtainable or obtained by carrying out a method according to the invention.

In particular embodiments, the organic functionalized matrix is in the form of a membrane. An organic functionalized matrix, such as a membrane, according to the invention may be a tube, disc, film, monolith, fiber, hollow fiber, capillaries, etc.

In an embodiment, said organic functionalized matrix is an inorganic filtration membrane or ceramic filtration membrane. For the purposes of the present invention, the expression "inorganic filtration membrane" or "ceramic filtration membrane" is intended to cover inorganic membranes which can be used for microfiltration, ultrafiltration or nanofiltration. The technique most commonly used for preparing such filtration membranes consists in depositing one or more selective layers a few hundreds of nanometers or less in thickness, constituting the filtering layer, onto a macroporous support matrix which provides the mechanical strength. The filtering layer is usually obtained by depositing mineral oxides onto the matrix, followed by a final heat treatment.

The metals ($M^1$) in the metal hydroxides or metal oxides forming the above-mentioned separating membrane layers, in particular those to be modified by direct covalent bonding, can be chosen, for example, from aluminium, titanium, strontium, yttrium, lanthanum, zirconium, hafnium, thorium, iron, and manganese and various possible mixtures thereof. The above mentioned separating membrane layers are preferably formed from transition metal oxide(s). In general, they are preferably of titanium oxide and/or of zirconium oxide.

In particular embodiments, the invention provides an organic functionalized matrix, wherein said matrix is a ceramic filtration membrane comprising a support made of inorganic material coated with at least one separating membrane layer having an average pore size of 1 to 10 nm. In a preferred example, said metal preferably is a Group IVb transition metal or mixtures thereof. More preferably, said transition metal is titanium and/or zirconium.

In particular embodiments, the invention provides an inorganic filtration membrane—also named ceramic filtration membrane herein- obtainable or obtained with the method according to the invention comprising a support made of inorganic material coated with at least one separating membrane layer comprising particles of metal on which an organic functional group ($R^1$ or $R^{1'}$) is directly covalently grafted. Said metal preferably is a Group IVb transition metal or mixtures thereof. More preferably, said transition metal is titanium and/or zirconium. Said organic functional group ($R^1$ or $R^{1'}$) is a group as defined herein, and preferably is chosen from the group comprising alkyl, fluoroalkyl, perfluoroalkyl, aryl, fluoroaryl, perfluoroaryl as defined above and any combinations thereof.

The present invention provides a matrix or membrane with modified surface properties having satisfactory chemical, mechanical, thermal and hydrothermal stability. The high stability originates from a direct covalent bonding of $R^1$ or $R^{1'}$ moieties as defined herein to the metal center ($M^1$) instead of via hydrolysable or leachable bindings such as described in the prior art.

Different techniques can be used for characterizing matrices or membranes modified according to the present invention.

As is known by a person skilled in the art, it is not easy to directly analyse the changes on the surface of a modified membrane toplayer, whether the modification is done by the procedures according to this invention, or in case of modification with other techniques known in the state of the art (e.g. silanation). This is due to the fact that the modification takes place in the pores of the thin toplayer, while the bulk of the membrane (support and intermediate layers) are not or hardly modified. Therefore, for all characterisation techniques that characterise the total of the membrane material, the presence of the much thicker membrane support masks the properties of the membrane toplayer (e.g. Thermal Gravimetric Analysis TGA, and pore size determination by N2 adsorption). Other techniques that do analyse only a limited thickness of the membrane, may have problems with the curvature of a tubular membrane (e.g. Infrared IR spectroscopy, and contact angle). Therefore, in the state of the art, an unsupported membrane toplayer material is very often used in order to characterize the properties of the supported membrane toplayer. This unsupported toplayer material is made in exactly the same way as the supported membrane toplayer (exactly the same sol-gel procedure, exactly the same amount of binder and exactly the same thermal treatments). Extensive characterisation of this unsupported membrane toplayer material modified according to this invention, is described in examples 1 to 5. The characterization methods employed in these examples are TGA, IR spectroscopy and leaching tests.

Thermogravimetric analysis (TGA) is applied to determine the amount of organic functional groups on the surface of the membrane as well as the thermal stability of the directly bonded functional groups. Temperatures at which a weight loss occurs give information on the strength of the bonding on the surface and provide indications on the stability of the bonded functional group. If weight loss occurs at higher temperatures, more stable bonds are present. The temperature will depend on the type of $R^1$ moiety. For short alkyls for instance, the temperature will usually be higher than 430° C., as is also clear from examples 1-5. This thermal stability will give indirect information on the strength of the bonding of the carbon atom to the metal centre $M^1$. Being a bulk technique, TGA is not applicable to modified membranes.

Infrared (IR) spectroscopy is applied to determine the presence of organic functional groups directly covalently bound to the metal oxide pore surface. As is shown in examples 1 to 5, the presence of direct $M^1$-C bonds is shown by specific peaks in the IR spectra. For instance, representative and typical for the direct Ti—C bonding in case of modification of $TiO_2$ is an IR peak at 1209 cm$^{-1}$ with a shoulder at 1240 cm$^{-1}$. Besides the peaks related to the direct $M^1$-C bonding, also functional group specific peaks can be observed at high (PhotoAcoustic IR spectroscopy, PAS-IR) and low wavelengths (DRIFT, Diffuse Reflectance IR Fourier Transform spectroscopy) such as exemplified in the example 4. The position and the strength of the IR-bands at the above-said wavelength on the modified material do not change upon stirring in water or alcohol at room temperature, as seen in example 5. It is difficult to use IR on tubular modified membranes due to the curvature of the membrane surface. A solution to this problem is the use of flat membranes or the use of a relative new version of the IR technique, micro ATR-IR (Attenuate Total Reflection IR) using microscopy to determine a limited spot on the surface of a matrix that is subjected to the IR radiation. Therefore, this technique is not problematic for a curved membrane surface.

Leaching tests can be performed by stirring/contacting modified unsupported membrane toplayer material, modified according to the invention, in/with water, an alcohol or any other media in which the stability needs to be tested, at room temperature or elevated temperatures for between 1 and 24 hours or longer if required. IR measurements can be applied to determine the changes before and after the leaching test. These tests therefore determine the stability of the modified material. As is shown in example 5, the stability of the modification according to this invention is much higher than the modification according to the state-of-the-art silanation. Leaching tests can also be performed on modified membranes. Changes can then be characterized by micro ATR-IR or by following the flux behavior before and after the leaching. In case of leaching, the flux behavior evolves as function of time towards the values measured for an unmodified membrane.

Flux measurements do not directly analyse the modification of the membrane surface, but are a perfect way to determine the effect of the membrane modification on the membrane performance. In case of hydrophobic modification with e.g. long alkyl chains, the flux of apolar solvents will increase, while the flux of polar solvent will decrease. This is shown in example 7. Another indirect characterization technique determining the effect of the membrane modification on the membrane performance is a molecular weight cut-off measurement. In case of modification with sufficiently long functional groups the molecular weight cut-off will clearly decrease, as described in example 8. Using hydrophobicity, the changes in contact angle may also be measured, indicating the degree of modification and hydrophobicity of the surface in relation to the membrane prior to modification.

Reaction Vessel

Within the present method, especially steps b) to d) may be carried out in a reaction vessel, and preferably in a reaction vessel which is adapted to keep the membrane under "substantially dry" reaction conditions, and preferably under "dry reaction conditions" as defined above. Step e) is preferably performed by filtration and therefore, in general, not executed within a reaction vessel. Also drying may be performed outside the reaction vessel in e.g. a drying/vacuum oven.

In one embodiment, a reaction vessel is provided which is adjusted to the shape of the membrane. This permits to limit the amount of solvents utilized during pretreatment and functionalization. In addition, this permits to use a limited amount of organometallic reagents (Grignard reagents or organolithium reagents) and solvents during the method. The use of an adapted reaction vessel further allows to perform the reaction in optimal dry conditions.

In particular embodiments the reaction vessel comprises equipment to permit to maintain (substantially) dry reaction conditions, as defined above.

Examples of such equipment include but are not limited to:
means for the introduction of inert gas, such as e.g. argon or nitrogen, in said vessel,
means for stirring and/or agitating said vessel and any solvent and/or reaction solution contained therein,
means for the introduction of solvents and reaction solutions as defined herein in the vessel under inert conditions,
means for stirring and/or agitating of a ceramic membrane as defined herein contained in said vessel, Uses The matrices according to the invention and obtained or obtainable by carrying out the present method find many uses in technical, biotechnological and medical fields.

In particular embodiments, the present invention therefore relates to the use of matrices or membranes as defined herein in filtration and/or separation processes, such as for instance separation processes, like ultrafiltration, nanofiltration, pervaporation and membrane contactor processes. Other useful applications are in air cleaning processes for the removal of dust particles or volatile organic compounds.

In particular embodiments, the present invention therefore relates to the use of matrices or membranes as defined herein as support in catalytic applications.

In particular embodiments, the present invention therefore relates to the use of matrices or membranes as defined herein as support in enzymatic applications.

In an example, by means of a modification according to the present invention, the character of the membrane can be changed, for instance from hydrophilic to hydrophobic. Such hydrophobic ceramic membranes can be applied in non-aqueous separation processes, e.g. the separation and purification of edible oil (food industry), for separation and re-use of homogeneous catalysts (pharmaceutical industry) or for solvent exchange (chemical industry).

EXAMPLES

Example 1

Preparation of a Modified Unsupported $TiO_2$ Membrane Layer According to the Invention An unsupported $TiO_2$ membrane layer was produced by preparing a colloidal sol as is typically used to make $TiO_2$ membrane toplayers with a pore size of 3 to 5 nm. The recipe of such a preparation is known in the art, and can be e.g. found in the following publication T. Van Gestel, C; Vandecasteele, A. Buekenhoudt, C. Dotremont, J. Luyten, R. Leysen, B. Van der Bruggen, G. Maes, J. Membr. Sci., 207, 2002, p 73-89. Specifically, for this example, the colloidal sol was produced by hydrolysis of Ti-tetra-isopropoxide ($Ti(OC_3H_7)_4$) (TTI, supplied by Acros Organics). Peptization of the sol was obtained using $HNO_3$. Subsequently, the same amount of extra solvent and binder was added as in the case of preparation of a real $TiO_2$ mesoporous membrane toplayers. However, in stead of dip-coating a porous membrane support with this diluted, binder containing sol as is done when preparing a membrane, this sol was poured in a petri disch, and allowed to dry at room temperature for 48 h. Finally this dry gel layer was calcined for 3 h at 470° C., as is the typical calcination for a supported membrane toplayer.

As is known in the state of the art, this procedure, identical to the procedure to produce supported membrane toplayers, garantees that the material of the unsupported membrane layer produced following this procedure, is very similar as the material of the supported membrane toplayer (similar pore size, similar amount of surface OH-groups, similar $TiO_2$ crystalline phase etc.). Characterisation on this unsupported membrane material is much more simple than directly on the supported membrane material, while for a lot of characterisation techniques the presence of the much thicker membrane support masks the properties of the membrane toplayer. Therefore, in the state of the art, this unsupported membrane material is very often used in order to characterise the properties of the supported membrane layer.

The unsupported $TiO_2$ membrane layer produced as described above, was crushed in a mortar in order to get fine powder. This powder was modified according to the method as disclosed in this patent, as follows. Three to four gram of the powder was brought into a dry glass reactor vessel. Subsequently the powder was dried overnight by heating the reactor vessel up to 190° C. and applying a vacuum of <5 $10^{-4}$ mbar (step a). Then, the powder was pre-treated with BuOH (step b). Hereto 100 ml of BuOH (1-butanol 99% extra pure, Acros Organics) was added to the vessel while preventing hydration of the powder by flowing argon through the vessel at certain time intervals. The butanol was vigorously stirred and heated to reflux temperature (85° C.). The powder was refluxed in the butanol solution for 48 hours under stirring in order to obtain etherification of the —OH functional groups on the powder. The powder pre-treated as such was filtered over a Macherey-Nagel (MN-640 w) filter and dried at 60° C. under vacuum (<$10^{-3}$ mbar) (step c). Half a gram of this powder was again brought into a dry glass reactor vessel with a three neck top and further modified with methyl organomagnesium bromide in diethylether (Sigma Aldrich, 3.0 M in diethylether) (step d). Hereto 30 ml of anhydrous diethylether ≥99.7% (Sigma-Aldrich) was added to the reaction vessel containing the dried powder. Afterwards, the reaction vessel was mounted on the reflux system and a dried dropping funnel with septum was installed on one neck of the reaction vessel. Also an argon flow was started up and bubbled through the reaction vessel. The reaction solution was agitated by stirring while under constant Argon flow during 30 minutes. Then, 6 mmol methyl organomagnesium bromide reagens was added to the vessel (while stirring) via the dropping funnel that was continuously flown with argon. The organometallic reagens was added via the septum and with the aid of a gas-tight syringe. After addition of the methyl organomagnesium bromide reagens, the constant argon flow was shut down to prevent strong evaporation of the solvent. However, the flow was shortly restored every few hours. The powder was treated for 3 days in this reaction solution at room temperature under constant stirring. Successful modification of the powder can be visually determined: the powder obtains a dark grey-black color due to the presence of magnesium compounds in the pores of the powder. Finally the powder was again decanted and filtered over a Whattman filter, and subsequently washed with 1.0 M HCl, $H_2O$ and methanol. After washing, the powder was dried overnight at 60° C. under vacuum ($<10^{-3}$ mbar) (step e).

The untreated powdered unsupported $TiO_2$ membrane layer (before step a) is further on shortly called untreated $TiO_2$ powder. The BuOH pre-treatment (step a up to step c) results into an unsupported membrane $TiO_2$ powder were the majority of the OH groups are replaced by Ti—O—$CH_2$—$CH_2$—$CH_2$—$CH_3$ surface groups, further on shortly called BuOH pre-treated $TiO_2$ powder. The full modification (step a up to step e) results into an unsupported membrane $TiO_2$ powder were the majority of the OH groups are replaced by Ti—$CH_3$ surface groups, further on shortly called C1 modified $TiO_2$ powder after BuOH pre-treatment.

Example 2

Figure 1:
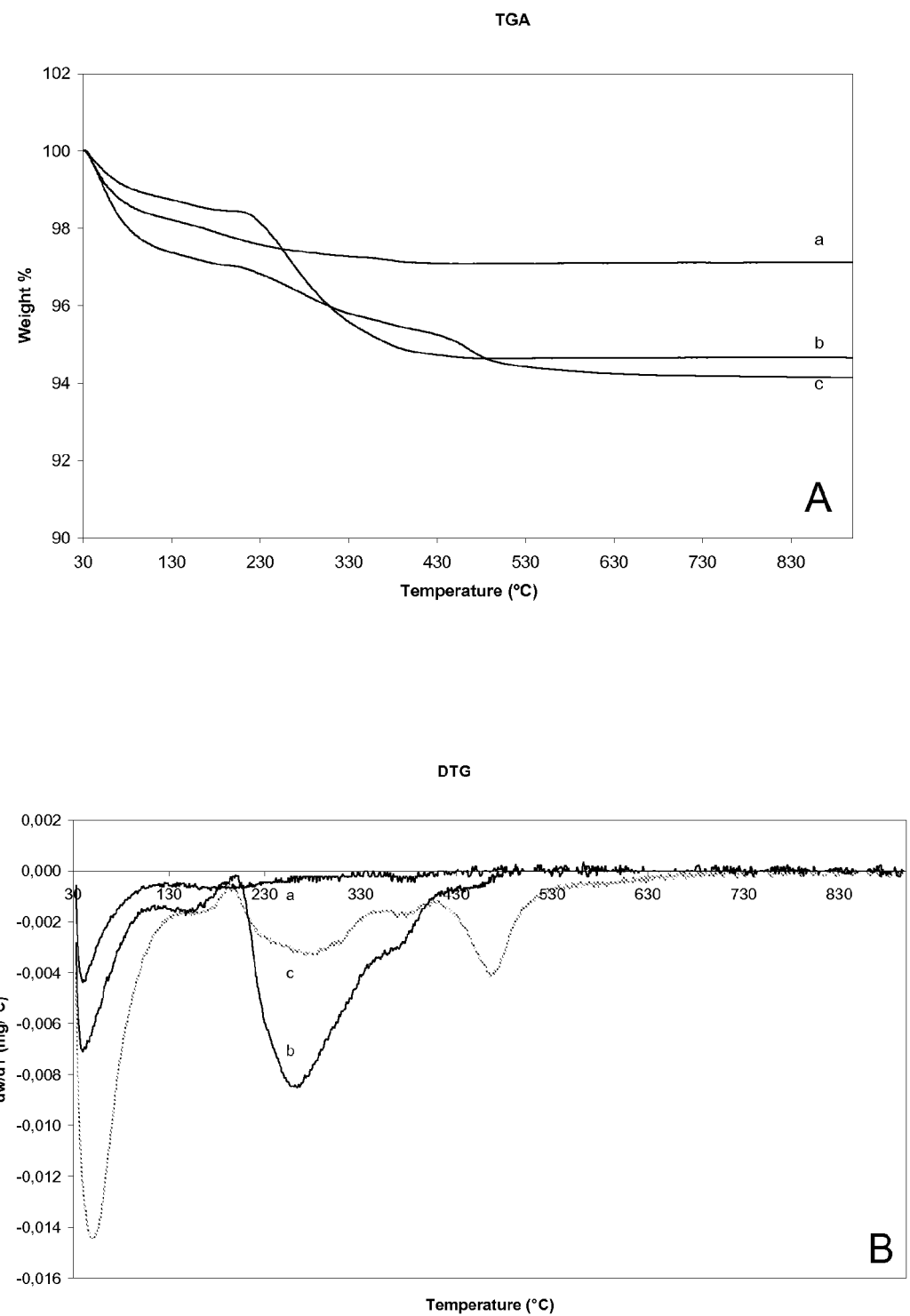
FIG. 1 shows Thermo Gravimetric Analysis (TGA) measurements (FIG. 1A) and corresponding Differential Temperature Gradient (DTG) measurements (FIG. 1B) of untreated $TiO_2$ powder (a), BuOH pre-treated $TiO_2$ powder (b) and $C_1$ modified $TiO_2$ powder after BuOH pre-treatment (c).

Characteristics of Powdered Unsupported $TiO_2$ Membrane Layer Modified According to the Invention Untreated $TiO_2$ powder, BuOH pre-treated $TiO_2$ powder and $C_1$ modified $TiO_2$ powder after BuOH pre-treatment was prepared as described in example 1. FIG. 1A shows the Thermo Gravimetric Analysis (TGA) and FIG. 1B the corresponding Differential Temperature Gradient (DTG) of the untreated $TiO_2$ powder, the BuOH pre-treated $TiO_2$ powder and the C1 modified $TiO_2$ powder after BuOH pre-treatment. These results show weight losses in different temperature regions. The alcohol pre-treatment causes weight loss between 230° C. and 430° C., due to the formation of weak Ti—O—C bonds. After modification with the methyl organomagnesium compound a weight loss above 430° C. is determined, due to the covalent metal-carbon binding ($M^1$-C in casu Ti—C).

Figure 2:
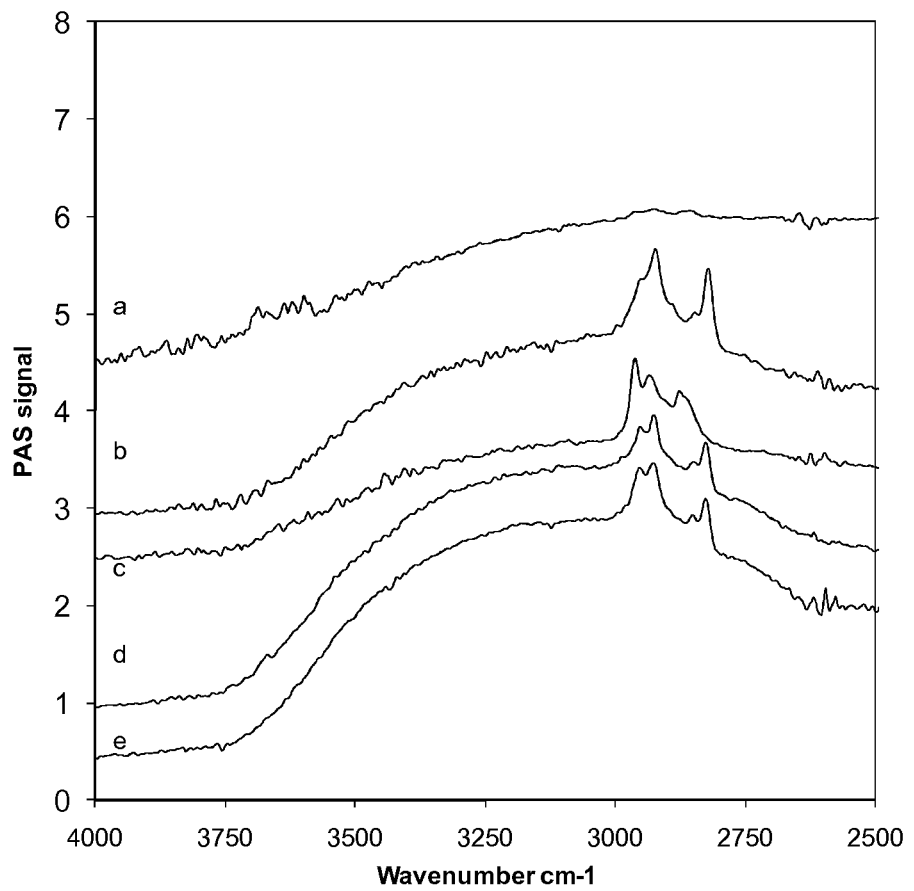
FIG. 2 shows Photo Acoustic Spectra (PAS) measurements of untreated $TiO_2$ powder (a), MeOH pre-treated $TiO_2$ powder (b), BuOH pre-treated $TiO_2$ powder (c), $C_5$ modified $TiO_2$ powder after MeOH pre-treatment (d) and $C_5$ modified $TiO_2$ powder after BuOH pre-treatment (e).

Untreated $TiO_2$ powder and BuOH pre-treated $TiO_2$ powder was prepared as described in example 1. In a similar way also MeOH pre-treated $TiO_2$ powder was prepared simply substituting BuOH by MeOH. In a similar way also C5 modified $TiO_2$ powder after BuOH or MeOH pre-treatment was prepared, simply substituting the methyl organomagnesium bromide by pentyl organomagnesium bromide. In FIG. 2 the Infrared (IR) results of the untreated $TiO_2$ powder, the BuOH and MeOH pre-treated $TiO_2$ powder and the C5 modified $TiO_2$ powder after MeOH and after BuOH pre-treatment are presented. FIG. 2 shows specifically the Photo Acoustic Spectra (PAS), which measure especially the free —OH groups at the surface (3600-3700 $cm^{-1}$), and the stretch C—H vibration of the present organic groups (2800-3000 $cm^{-1}$). The stretch vibration pattern of the C—H vibrations has changed due to the pentyl organomagnesium modification. This pattern also depends on the used alkyl chain (different $CH_3$/$CH_2$ proportion).

Figure 3:
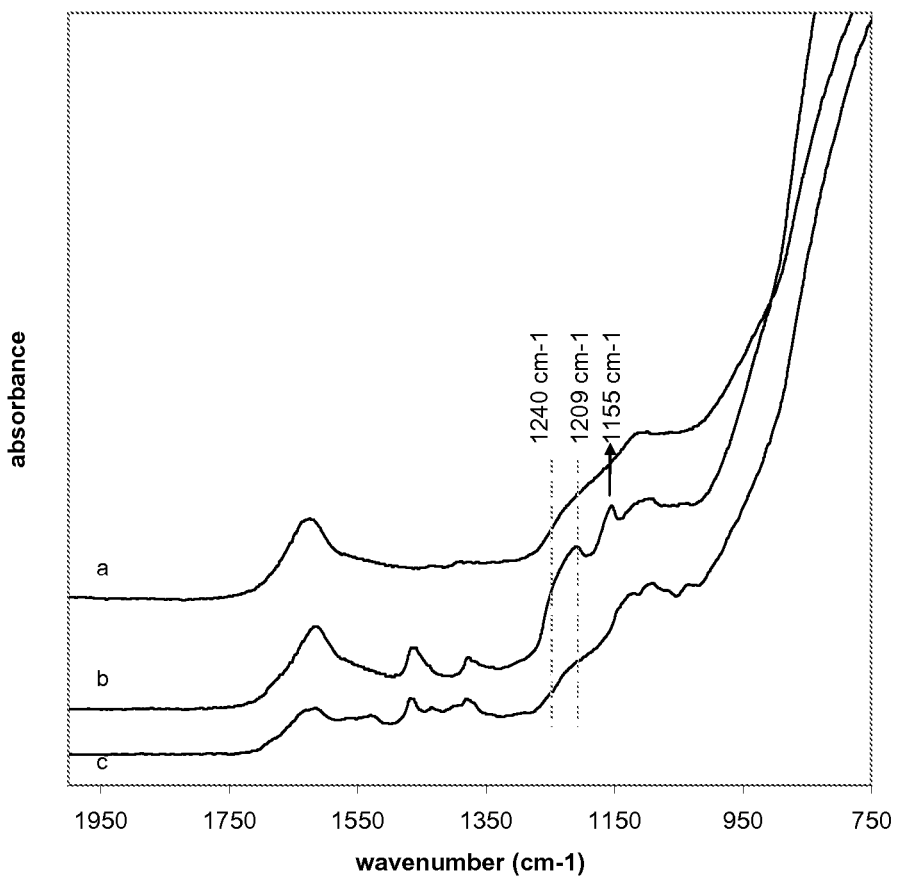
FIG. 3 shows DRIFT spectra measured for untreated $TiO_2$ powder (a), $C_1$ modified $TiO_2$ powder after BuOH pre-treatment (b) and BuOH pre-treated $TiO_2$ powder (c).

Alkyl organomagnesium modification also leads to changes in the lower infrared region, presented in the Diffuse Reflection Infra Red Fourier Transform (DRIFT) spectra. FIG. 3 shows DRIFT spectra for untreated $TiO_2$ powder, BuOH pre-treated $TiO_2$ powder and $C_1$ modified $TiO_2$ powder after BuOH pre-treatment (prepared as described in example 1, but with a BuOH pretreatment of only 3 hours). Two new bands are observed: 1155 $cm^{-1}$, due to adsorbed ether solvent and 1209 $cm^{-1}$ with a shoulder at 1240 $cm^{-1}$, due to the alkyl modification. and representative for the direct Ti—C bond. Moreover, other bonds, typical for the applied alkyl group (in casu $CH_3$ at 1372 and 1460 $cm^{-1}$) can be observed between 1350 $cm^{-1}$ and 1500 $cm^{-1}$ and are assigned to the bending vibrations of the C—H bonds.

The hydrophobicity of the modified $TiO_2$ powder increases with respect to the untreated $TiO_2$ powder and the MeOH pre-treated $TiO_2$ powder. This was tested by dispersing the different powders in a 1/1 hexane/water mixture. For C8 modified $TiO_2$ powder after MeOH pre-treatment (prepared as in example 1 replacing methyl organomagnesium bromide by octyl organomagnesium bromide), the octyl organomagnesium modified material stays at the hexane/water interface, whereas the untreated $TiO_2$ powder is at the bottom in the water layer and the MeOH pre-treated $TiO_2$ powder floats trough the water phase (data not shown).

Example 3

Figure 4:
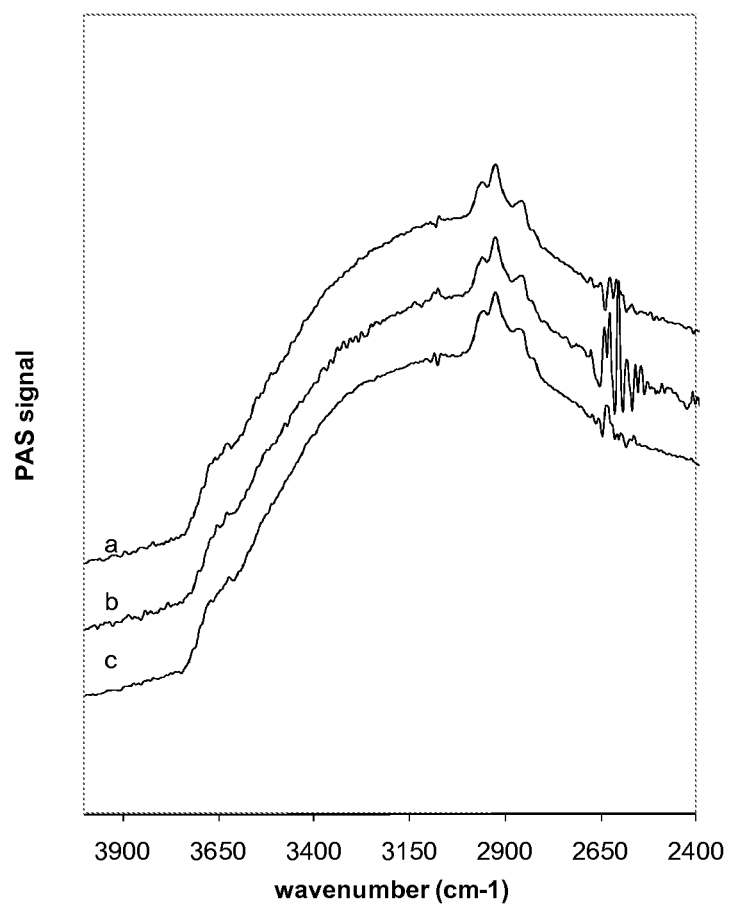
FIG. 4 shows Photo Acoustic Spectra (PAS) measurements of C8 modified $TiO_2$ powder modified in diethylether (a), C8 modified $TiO_2$ powder modified in THF (b), and C8 modified $TiO_2$ powder modified in CPME (c), all after BuOH pre-treatment.

Preparation and Characteristics of Powdered Unsupported $TiO_2$ Membrane Layer Modified According to the Invention Using Different Solvents In this example, powdered unsupported $TiO_2$ membrane layer material was modified similar as described in example 1 but now using different solvents for the reaction with the alkyl organomagnesium bromide in step d. The reaction was executed by the described method in diethylether (DEE), tetrahydrofuran (THF) and cyclopentylmethyl ether (CPME). MeOH was used as alcohol for the pre-treatment and octyl organomagnesium bromide as organomagnesium compound. The TGA results of these modified unsupported $TiO_2$ membrane layers show weight losses above 430° C., indicating that a covalent $M^1$-C bond was formed in all solvents. The PAS-IR spectra of these materials are presented in FIG. 4 and shows that the stretch vibration of the C—H bond of the octyl functional group for all powders.

The modified $TiO_2$ powders were also dispersed in water/hexane mixtures. All powders stayed at the water/hexane interface layer, proving their increased hydrophobic character due to the presence of octyl chains on the surface.

Example 4

Preparation and Characteristics of Powdered Unsupported $TiO_2$ Membrane Layer Modified According to the Invention Using Different Organometallic Compounds In this example, powdered unsupported $TiO_2$ membrane layer material was modified similar as described in example 1 but now using octyl organomagnesium bromide (C8 modified) and the perfluorooctylmagnesium bromide $CF_3(CF_2)_5(CH_2)_2MgBr$ (C8F modified) as modifying organomagnesium compound. The reactions were performed in diethylether and the pre-treatment was done with BuOH.

Figure 5:
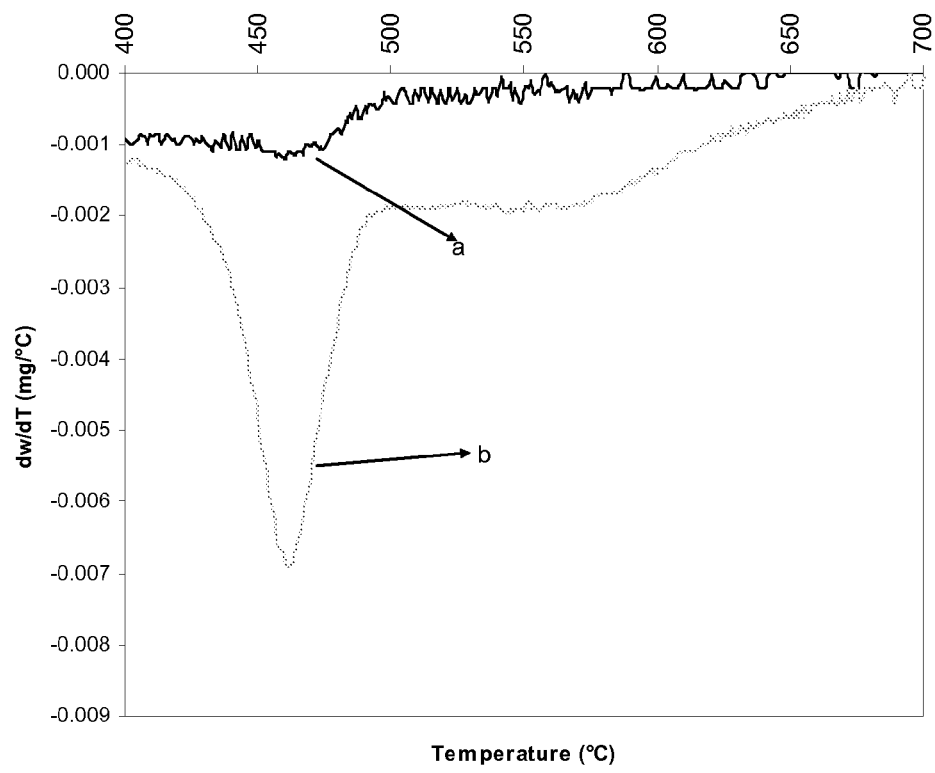
FIG. 5 shows Differential Temperature Gradient (DTG) measurements of the high temperature part of C8 modified TiO2 powder (a) and C8F modified TiO2 powder (b) after BuOH pre-treatment.

The DTG results (see FIG. 5) show for both modifications a weight loss above 430° C., indicating the formation of a direct covalent $M^1$-C binding. The weight loss for the perfluorooctyl-modified material is markedly higher due to the higher molecular mass of the fluor atoms.

Figure 6:
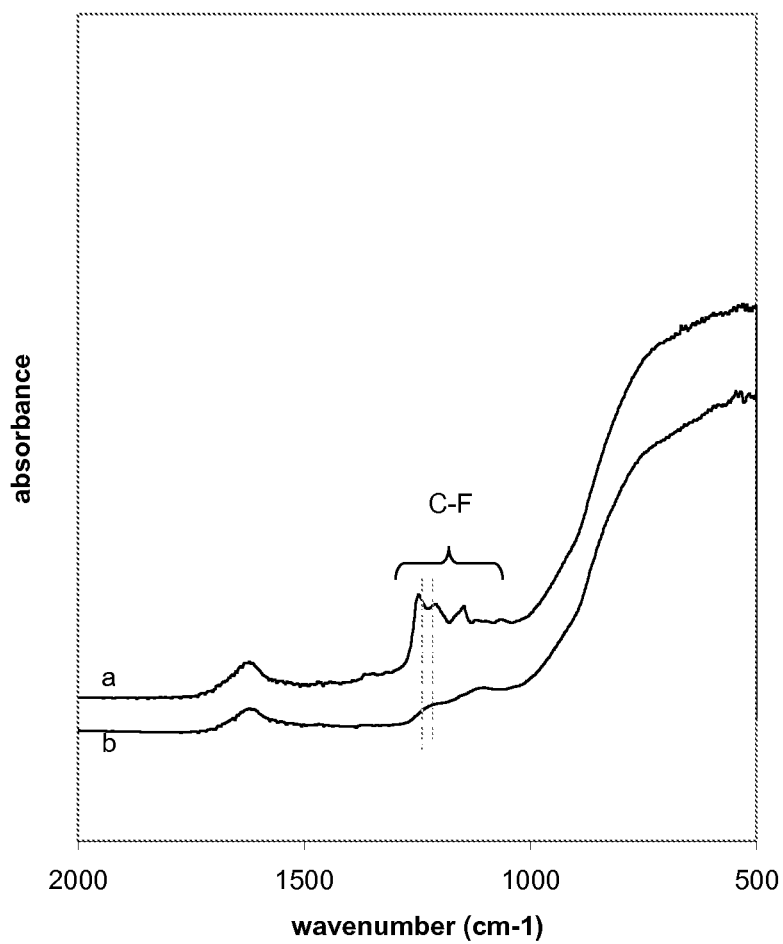
FIG. 6 shows DRIFT spectra measured for C8F modified $TiO_2$ powder (a) and C8 modified $TiO_2$ powder (b) after BuOH pre-treatment.

The C8F modified $TiO_2$ powder shows several strong bands, originating from the C—F bonds in the low range IR DRIFT spectra (see FIG. 6). These IR bands are known in the art to be situated in the region between 1100 and 1400 $cm^{-1}$.

Example 5

Stability of the Powdered Unsupported $TiO_2$ Membrane Layer Modified According to the Invention Versus Silanated Materials This example illustrates the enhanced stability of the functionalized membranes prepared according to this invention in relation to the state of the art membranes functionalized via silanation. Powdered unsupported $TiO_2$ membrane layer material was modified similar as described in example 1 but now no pre-treatment with an alcohol was done. On the other hand, a silanation reaction was done on the powdered unsupported $TiO_2$ membrane material as follows: 1 gram of the powdered unsupported $TiO_2$ membrane material was dried overnight in an oven at 300° C. Subsequently, the material was transferred into a glovebox that is constantly purged with dry air. The material was added to a beaker containing a solution of 80 ml of dried toluene (dried on molecular sieve) and stirred vigorously. A dropping funnel that was hanging above the beaker was filled with a mixture of 20 ml of dry toluene and 4 ml of DCDMS (dichlorodimethylsilane). The DCDMS solution was added dropwise to the beaker and continued to stir for 1 hour. Afterwards, the solution was decanted and filtrated over a Whattman filter and washed three times with 20 ml of toluene. After drying on the filter, the material was transferred into a sample holder of the vacuum installation, sealed, removed from the glovebox and dried overnight under vacuum ($<10^{-3}$ mbar) at 60° C. The obtained material was characterized with clear chemically bonded Ti—O—Si—$CH_3$ bonds on the surface as analyzed by methods known in the state of the art such as TGA, IR (PAS and DRIFT).

FIG. 7 shows the PAS IR spectra of the powdered unsupported $TiO_2$ membrane material before and after modification with a methyl magnesium bromide reagent according to this invention as well as after silanation (DCDMS in casu). Furthermore, it shows the changes in the C—H bondings after refluxing the material for 1 hour in water. As can be seen from FIG. 7, the material modified with the methyl magnesium bromide according to the invention still shows a similar amount of C—H functional groups, while the material modified via silanation has lost most of the organic functional groups.

Similarly, from the DRIFT spectra (FIG. 8) it can be observed that after refluxing in water, the typical pattern of methyl magnesium bromide modified $TiO_2$ according to the invention is still present and the typical Ti—C bond at 1209 $cm^{-1}$ did not change. In contrast, the bond at 1266 $cm^{-1}$, as know in the art as the typical wavelength assigned to Si—C, is no longer visible indicating a substantial leaching of the functional group after refluxing in water for 1 hour. The leaching of the Si—C functional group is caused by the weak stability of the Ti—O—Si bond towards hydrolysis as is also known in the state of the art.

Example 6

Preparation of a Surface-Modified Ceramic Membrane Comprising $TiO_2$

This example illustrates the modification of a surface of a ceramic metal oxide membrane, and in particular a membrane comprising titanium. In this example a 12 cm long tubular ceramic membrane with titania sol-gel derived top layer was functionalized. The membrane has a minimum pore size of 3 nm.

Prior to modification, the membrane was sealed at both ends with a Teflon coating. Then, the sealed tubular ceramic membrane was dried overnight in a vacuum oven at 200 mbar and 190° C. to obtain a substantially dry membrane surface layer.

The membrane was then transferred into a reaction system adjusted to the shape of the membrane.

For instance a reaction vessel may be used which comprises a three neck top. A cooler, a gas liner provided with closing valve, and a dropping funnel provided with pressure balance are connected to said vessel. The reaction vessel has for instance a build in porous grid with sufficiently large pores to allow stirring and agitation of a solution in the reaction vessel without damaging a ceramic membrane contained in the vessel. The vessel has a narrowed section at a few centimeters from the bottom of the reaction vessel so that the grid can be placed on it with a stirring rod under it. The reaction vessel has a limited space left above and next to the ceramic membrane so that it can move in the vessel upon agitation of the vessel and/or the membrane and allow better diffusion of solvent and reaction solution to a surface of the membrane. It shall be clear however, that other types of reaction vessels or reaction system can be used in the context of the present invention.

In the present example, during the pre-treatment step with alcohol, the dropping funnel was replaced by a plug.

The tubular membrane was positioned vertically (it can however also be tilted on the grid) so that it can be agitated and so that damage caused by a stirring rod can be prevented. The dimensions of the vessel were chosen in such a way that about 5 cm of liquid can stand above the membrane. The vessel is a few centimeters broader than the membrane so that agitation can take place to allow sufficient contact and good diffusion of liquid present in the vessel to pores of the membrane. In this way, the need for large amounts of solvents is prevented and agitation is optimal.

After introduction in the vessel, the dried tubular membrane was reacted with an alcohol. Butanol (n-butanol-1-ol rectapur, VWR International Inc.) was added to the vessel while preventing hydration of the membrane. The butanol solution was vigorously agitated by e.g. stirring and shaking and heated to reflux temperature. The membrane was refluxed in the butanol solution for 48 hours under vigorous agitation in order to obtain etherification of the —OH functional groups on the membrane (M-O—$R^2$ is formed). To prevent hydration of the membrane when adding the alcohol solvent, argon was bubbled through the alcohol solvent for some time. Also, when starting heating of the reflux an argon flow was maintained for a few minutes. Moreover, every few hours, argon was again introduced into the vessel to prevent the diffusion of water into the reaction vessel. It should be noted that instead of the-above described adjusted reflux setup, an adjusted schlenk setup could also be applied. The reflux setup was maintained dry during the entire process: for this a water seal was present.

After the alcohol treatment step, the alcohol solution was removed from the reaction vessel and the membrane and reaction vessel, including grid and stirring rod, were dried overnight in a vacuum oven at 60° C. and 200 mbar. The butanol solution can be recycled for later use if dried by passing it over a molecular sieve.

Subsequently, the pre-treated membrane was modified under dry conditions in an adjusted reflux setup similar as the one described above. In this case, to assure dry conditions and successful functionalisation, similar measures were taken as described above to prevent introduction of moisture (e.g. water vapor from the environment) in the reaction vessel. In addition, additional measures were taken, including a cooling down of the reaction vessel after drying in a dry gasflow glovebox. Moreover, the solvent applied during the Grigard reaction was filled in the reaction vessel inside the glovebox and the vessel was then closed during transfer to the reflux setup.

70 ml of dry diethylether was added to the reaction vessel containing the dried membrane. Addition of the solvent was done in a glovebox. Afterwards, the reaction vessel was mounted on the reflux system and a dried dropping funnel with septum was installed on the three neck. Also an argon flow was started up and bubbled trough the reaction vessel. The reaction solution was agitated by stirring and shaking and a constant argon flow was installed. Then, 6 ml of the organometallic reagent pentylmagnesiumbromide ($C_5H_{11}MgBr$, 2.0 M in diethylether, Sigma-Aldrich) was added to the vessel via a dropping funnel that was dried prior to installation and that was continuously flown with argon. The organometallic reagent was added via a septum and with the aid of a gas-tight syringe. The reaction solution was subjected to vigorous agitation including shaking and stirring. After about 30 minutes, the argon flow was shut down to prevent strong evaporation of the solvent. The membrane was treated for 6 days in this reaction solution at room temperature and under vigorous agitation. Although no heating was applied in this step, a cooling was switched on to prevent strong evaporation of the diethylether. Again every few hours, argon was again introduced into the vessel to prevent the diffusion of moisture into the reaction vessel.

Successful modification of the titania surface of the membrane can be visually determined: the toplayer surface obtains a grey-black color due to the presence of magnesium compounds in the pores of the membrane.

Then, the reaction solution was poured off and the membrane was washed subsequently with 1.0 M HCl, $H_2O$ and methanol (synthesis grade, VWR International Inc.). This series of washings may me successively repeated. Preferably washing is done by means of filtration to prevent that hydrophilic Mg-salts would remain on the membrane and/or in the membrane pores.

After washing, the membrane was dried overnight in a vacuum oven at 200 mbar and 60° C.

Example 7

Characteristics of a Surface-Modified Ceramic Membrane Comprising $TiO_2$ According to the Invention The membrane obtained according to example 6 was compared to a ceramic membrane with titania sol-gel derived toplayer that has not been modified. Both membranes were subjected to IR spectroscopy at a spectrum between 4000 $cm^{-1}$ to 400 $cm^{-1}$ according to techniques that are well known in the art.

Micro ATR-IR spectra indicate that a membrane as modified in example 6 shows a peak at a wavelength of about 1209 $cm^{-1}$, indicating that a direct covalent metal-carbon binding (Ti—C) has been obtained on the surface of the membrane. In contrast, the unmodified membrane does not display a peak at this same wavelength.

Example 8

Flux Behavior of Ceramic Membranes Comprising $TiO_2$ Surface-Modified According to the Invention In this example flux behavior of a ceramic membrane comprising $TiO_2$ that has been modified according to a method as disclosed herein was compared to flux behavior of a hydrophilic, i.e. an unmodified membrane comprising $TiO_2$.

The modified $TiO_2$ membrane analyzed in this example consisted of a membrane comprising a $TiO_2$ toplayer with pores of about 3 nm that was functionalized twice sequentionally; i.e. a method as described in example 6 was performed twice as from the drying step with pentylmagnesiumbromide (as in example 6 but the same modification now repeated).

Flux behavior was measured using a nanofiltration setup. Flux measurements were performed at room temperature and 5 bar. Water and hexane were allowed to flow through the membranes and fluxes were measured. Filtrations of hexane and water were done for more than 4 hours. At such time point the membranes were sufficiently conditioned to provide stabilized and reliable fluxes when percolating/flowing a solvent through the membrane. In between the flux measurement of water and the flux measurement of hexane, ethanol was filtrated through the membrane. Since water and hexane are not miscible, the solvent ethanol, miscible both in water and in hexane, causes a proper wetting of the nanometer sized pores of the membranes with water or hexane. Table 1 illustrates the results of the flux measurements.

TABLE 1

Flux measurements for a hydrophilic $TiO_2$ membrane and a $TiO_2$ membrane that was functionalized twice with pentylmagnesiumbromide.

|  | Hexane flux/water flux |
| --- | --- |
| Unmodified, hydrophilic $TiO_2$ | 2 |
| Pentyl modified $TiO_2$ | 6 |

The ratio of the hexane flux to the water flux for the modified membrane is clearly higher, illustrating a more hydrophobic nature of the pentyl modified membrane.

Example 9

Pore Size Engineering

The present example illustrates that the present method can be applied to engineer pore size of ceramic membranes. In particular, in this example the pore size of an unmodified ceramic membrane comprising $TiO_2$ was compared with the pore size of a ceramic membrane comprising $TiO_2$ as obtained in example 6. In this example, the cut-off of the membranes measured with a polyethyleneglycol (PEG) mixture in water, is used as a measure for the pore size of the membranes. For the PEG mixture, PEG's with different molecular weights were used. The mixture consisted of 1 g/l PEG with molecular weight of 600, 1g/l PEG with molecular weight of 1500, 1 g/l PEG with molecular weight of 3000 and 1 g/l PEG with molecular weight of 10 000. The cut-off measurements were done at room temperature, and at a pressure leading to a mixture flux equal to or lower than 40 l/hm². In this way, the cut-off of the unmodified membrane was measured to be 6000 Dalton. After 1 modification, the cut-off has decreased to a value of 4000 Dalton. This illustrates that the functionalisation method described herein permits to decrease the pore diameter of ceramic membranes.

The invention claimed is:

1. A method for obtaining an organic functionalized matrix having direct covalent bond of one or more different organic functional moieties to its surface comprising the steps of:
   a) drying an inorganic matrix comprising a metal oxide comprising a metal $M^1$ and/or a metal hydroxide comprising a metal $M^1$ under vacuum,
   b) removing protons of the dried inorganic matrix by reacting said dried matrix with a reagent,
   c) removing the excess of said reagent to form a dried matrix, and
   d) reacting the dried matrix obtained in step c) in the presence of a dry solvent with one or more organometallic reagents comprising said one or more organic functional moieties,
   wherein the direct covalent bond of the organic functional groups to the surface of the substrate results in an $M^1$-C bond not including an oxygen bridge.

2. The method according to claim 1, wherein the one or more organometallic reagents independently are of the formula $R^1$-$M^2$, $R^1$-$M^2$-X, or $R^1$-$M^2$-$R^{1\prime}$, wherein $R^1$ and $R^{1\prime}$ are organic functional groups and wherein $R^1$ and $R^{1\prime}$ are different or identical, $M^2$ is Li or Mg, and X is a halogen.

3. The method according to claim 1, wherein said metal $M^1$ is a Group IVb transition metal or mixtures thereof.

4. The method of claim 3, wherein said transition metal is titanium, zirconium, or mixtures thereof.

5. The method according to claim 1, wherein the reagent of step b) is an alcohol of formula $R^2$-OH wherein $R^2$ is an alkyl.

6. The method of claim 5, wherein said alkyl is a linear $C_1$-$C_8$ alkyl, a linear $C_1$-$C_4$ alkyl or a $C_1$alkyl.

7. The method according to claim 1, wherein step b) is performed for at least several hours at the reflux temperature of said alcohol.

8. The method of claim 7, wherein step b) is performed for more than 3 hours at the reflux temperature.

9. The method according to claim 1, wherein in step c) the matrix obtained in step b) is dried under vacuum prior to step d).

10. The method according to claim 1, wherein step d) is carried out at a temperature which is lower than the boiling point of said dry solvent.

11. The method according to claim 1, wherein said steps b) to d) are carried out under inert atmosphere.

12. The method of claim 11, wherein said inert atmosphere is nitrogen.

13. The method according to claim 1, wherein said method is repeated one or more times.

14. An organic functionalized matrix obtained by carrying out a method according to claim 1.

15. The method of claim 1, wherein the reagent of step b) is an alcohol.

16. An organic functionalized matrix comprising a metal hydroxide comprising a metal $M^1$ and/or a metal oxide comprising a metal $M^1$, wherein said organic functionalized matrix has a direct covalent bond of one or more different organic functional moieties to its surface via an $M^1$-C bond not including an oxygen bridge.

17. The organic functionalized matrix according to claim 16, wherein said matrix comprises an inorganic filtration membrane comprising a support made of inorganic material coated with at least one separating membrane layer comprising particles of transition metal hydroxides and/or transition metal oxides at the surface having an average pore size of 1 to 10 nm.

18. A method for filtration, adsorption or separation comprising applying a sample to the organic functionalized matrix according to claim 16.

19. An inorganic filtration membrane comprising a support made of inorganic material coated with at least one separating membrane layer comprising particles of transition metal hydroxides via an $M^1$-C bond not including an oxygen bridge and/or transition metal oxides via an $M^1$-C bond not including an oxygen bridge at the surface of which an organic functional group is covalently grafted via an $M^1$-C bond not including an oxygen bridge.

20. The inorganic filtration membrane according to claim 19, wherein the organic functional group coupled to the surface is alkyl, (per)fluoroalkyl, aryl, (per)fluoroaryl, or any combination thereof.

21. A method for filtration, adsorption or separation comprising applying a sample to the inorganic filtration membrane according to claim 19.

* * * * *